(12) United States Patent
Plondke et al.

(10) Patent No.: US 9,606,818 B2
(45) Date of Patent: Mar. 28, 2017

(54) SYSTEMS AND METHODS OF EXECUTING MULTIPLE HYPERVISORS USING MULTIPLE SETS OF PROCESSORS

(71) Applicant: QUALCOMM Incorporated, San Diego, CA (US)

(72) Inventors: Erich James Plondke, Austin, TX (US); Lucian Codrescu, Austin, TX (US); Christopher Edward Koob, Round Rock, TX (US); Piyush Patel, Cary, NC (US); Thomas Andrew Sartorius, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 383 days.

(21) Appl. No.: 13/829,023

(22) Filed: Mar. 14, 2013

(65) Prior Publication Data

US 2014/0282508 A1 Sep. 18, 2014

(51) Int. Cl.
| | |
|---|---|
| G06F 9/455 | (2006.01) |
| G06F 9/46 | (2006.01) |
| G06F 7/04 | (2006.01) |
| G06F 21/00 | (2013.01) |
| G06F 9/50 | (2006.01) |
| G06F 12/10 | (2016.01) |

(52) U.S. Cl.
CPC ........ *G06F 9/45533* (2013.01); *G06F 9/5016* (2013.01); *G06F 12/109* (2013.01); *G06F 2212/1021* (2013.01); *G06F 2212/151* (2013.01); *G06F 2212/656* (2013.01)

(58) Field of Classification Search
None
See application file for complete search history.

(56) References Cited

U.S. PATENT DOCUMENTS

| | | | |
|---|---|---|---|
| 6,286,092 B1 | 9/2001 | Frank et al. | |
| 6,516,373 B1 | 2/2003 | Talbot et al. | |
| 6,732,250 B2 | 5/2004 | Durrant | |
| 6,981,072 B2 | 12/2005 | Day et al. | |
| 7,134,007 B2 | 11/2006 | Zimmer et al. | |

(Continued)

FOREIGN PATENT DOCUMENTS

| | | |
|---|---|---|
| EP | 2498183 A2 | 9/2012 |
| WO | 0137088 A2 | 5/2001 |

(Continued)

OTHER PUBLICATIONS

Shivkumar, Hewlett Packard Enterprise Community Home thread titled Job scheduler on HPUX, Dec. 2005.*

(Continued)

*Primary Examiner* — Bing Zhao
(74) *Attorney, Agent, or Firm* — Toler Law Group, PC

(57) ABSTRACT

An apparatus includes a primary hypervisor that is executable on a first set of processors and a secondary hypervisor that is executable on a second set of processors. The primary hypervisor may define settings of a resource and the secondary hypervisor may use the resource based on the settings defined by the primary hypervisor. For example, the primary hypervisor may program memory address translation mappings for the secondary hypervisor. The primary hypervisor and the secondary hypervisor may include their own schedulers.

31 Claims, 4 Drawing Sheets

(56) References Cited

U.S. PATENT DOCUMENTS

| | | |
|---|---|---|
| 7,299,337 B2 | 11/2007 | Traut et al. |
| 7,620,678 B1 | 11/2009 | Master et al. |
| 7,685,409 B2 | 3/2010 | Du et al. |
| 7,739,476 B2 | 6/2010 | Pan et al. |
| 7,962,909 B1 | 6/2011 | Klaiber |
| 8,135,898 B2 * | 3/2012 | Ben-Yehuda ......... G06F 12/109 711/6 |
| 8,250,254 B2 | 8/2012 | Saripalli |
| 8,312,230 B2 | 11/2012 | Jacobs et al. |
| 2002/0138679 A1 | 9/2002 | Koning et al. |
| 2004/0139442 A1 | 7/2004 | Miyamoto |
| 2005/0251806 A1 | 11/2005 | Auslander et al. |
| 2006/0005188 A1 | 1/2006 | Vega et al. |
| 2007/0169127 A1 | 7/2007 | Kashyap |
| 2007/0283336 A1 | 12/2007 | Gschwind et al. |
| 2008/0244599 A1 | 10/2008 | Hodson et al. |
| 2009/0217276 A1 | 8/2009 | Brenner et al. |
| 2009/0282198 A1 | 11/2009 | Hamoudi et al. |
| 2010/0107249 A1 | 4/2010 | Krig |
| 2010/0125708 A1 | 5/2010 | Hall et al. |
| 2010/0153945 A1 | 6/2010 | Bansal et al. |
| 2010/0242014 A1 | 9/2010 | Zhu |
| 2010/0325454 A1 * | 12/2010 | Parthasarathy ............... 713/320 |
| 2011/0072428 A1 | 3/2011 | Day, II et al. |
| 2011/0296406 A1 | 12/2011 | Bhandari et al. |
| 2012/0072638 A1 | 3/2012 | Grubb et al. |
| 2012/0240112 A1 | 9/2012 | Nishiguchi et al. |
| 2012/0272015 A1 | 10/2012 | Fahrig |
| 2012/0291033 A1 | 11/2012 | De Justo Teixeira et al. |
| 2013/0013889 A1 | 1/2013 | Devaraj et al. |
| 2013/0036323 A1 | 2/2013 | Goose et al. |
| 2013/0055252 A1 | 2/2013 | Lagar-Cavilla et al. |
| 2014/0053272 A1 * | 2/2014 | Lukacs et al. .................. 726/24 |
| 2014/0244983 A1 | 8/2014 | McDonald et al. |
| 2014/0281332 A1 | 9/2014 | Koob et al. |
| 2014/0282507 A1 | 9/2014 | Plondke et al. |

FOREIGN PATENT DOCUMENTS

| | | |
|---|---|---|
| WO | 2005029326 A1 | 3/2005 |
| WO | 2008054619 A2 | 5/2008 |
| WO | 2012005949 A2 | 1/2012 |

OTHER PUBLICATIONS

Tadokoro et al. "A Secure System-wide Process Scheduler across Virtual Machines," 2010 IEEE 16th Pacific Rim International Symposium on Dependable Computing (PRDC), DOI: 10.1109/PRDC.2010.34, Publication Year: 2010 , pp. 27-36.

International Search Report and Written Opinion for International Application No. PCT/US2014/023445, ISA/EPO, Date of Mailing Jul. 3, 2014, 9 pages.

* cited by examiner

SYSTEMS AND METHODS OF EXECUTING MULTIPLE HYPERVISORS USING MULTIPLE SETS OF PROCESSORS

I. CROSS-REFERENCE TO RELATED APPLICATIONS

The present application is related to co-pending U.S. patent application Ser. No. 13/828,183, entitled "SYSTEMS AND METHODS OF USING A HYPERVISOR WITH GUEST OPERATING SYSTEMS AND VIRTUAL PROCESSORS"and filed Mar. 14, 2013. The present application is also related to co-pending U.S. patent application Ser. No. 13/777,314, entitled "EXECUTING AN OPERATING SYSTEM ON PROCESSORS HAVING DIFFERENT INSTRUCTION SET ARCHITECTURES" and filed Feb. 26, 2013. The content of each of the above-referenced applications is incorporated by reference in its entirety.

II. FIELD

The present disclosure is generally related to virtualization of operating systems using multiple hypervisors.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

Computing devices, such as mobile phones, may include multiple processors. For example, a mobile phone may include a central processing unit (CPU) (sometimes referred to as an application processor) and a digital signal processor (DSP). Each processor may be better suited than the other processor(s) to perform certain computation tasks. For example, the CPU, which may act as the primary processor and may execute the mobile phone operating system, may be more efficient in executing "control code." such as web browser and user interface code. On the other hand, the DSP may be more efficient than the CPU when executing signal processing and other math-intensive functions. The CPU and the DSP may have distinct instruction set architectures. Thus, applications designed to run on the CPU may be incompatible with the DSP, and vice versa.

In certain situations, it may be advantageous to execute multiple operating systems at a single computing device. In computing devices that execute multiple operating systems, a hypervisor (also known as a virtual machine monitor) may be used to provide abstractions of available hardware resources to the operating systems. Thus, the hypervisor may act as an operating system for the multiple operating systems. However, it may be difficult to design a hypervisor that can be concurrently executed across sets of processors that have different instruction set architectures.

IV. SUMMARY

Systems and methods of hypervisor execution across multiple sets of processors are disclosed. In accordance with the described techniques, one of the hypervisors in the system may be a "primary" hypervisor and the remaining hypervisors in the system may be "secondary" hypervisors. The primary hypervisor may run on a different set of processors than the secondary hypervisors. For example, the primary hypervisor may be compatible with a different instruction set architecture than the secondary hypervisors.

The primary hypervisor may restrict the secondary hypervisors from performing certain operations, and may instead force the secondary hypervisors to rely on the primary hypervisor for the performance of the restricted operations. For example, the primary hypervisor may determine physical address mappings for the secondary hypervisors for security purposes (e.g., to prevent situations in which multiple secondary hypervisors attempt to create a mapping to the same physical address).

The secondary hypervisors may perform certain operations without relying on the primary hypervisor. For example, the secondary hypervisors may be able to perform task scheduling without intervention by the primary hypervisor. Enabling the secondary hypervisors to perform their own task scheduling may enable the secondary hypervisors to maintain quality of service (QoS) guarantees (e.g., latency guarantees) for guest operating systems executing on the secondary hypervisors.

In a particular embodiment, an apparatus includes a primary hypervisor that is executable on a first set of processors and a secondary hypervisor that is executable on a second set of processors. The primary hypervisor is configured to program memory address translation mappings and the secondary hypervisor is configured to use the memory address translation mappings.

In another particular embodiment, an apparatus includes a primary hypervisor that is executable on a first set of processors and a secondary hypervisor that s executable on the second set of processors. The primary hypervisor includes a first scheduler and the secondary hypervisor includes a second scheduler that is different from the first scheduler.

In another particular embodiment, an apparatus includes a primary hypervisor that is executable on a first set of processors and a secondary hypervisor that is executable on a second set of processors. The primary hypervisor is configured to define settings of a resource and a secondary hypervisor that is configured to use the resource based on the settings.

In another particular embodiment, a method includes retrieving, by a secondary hypervisor executing on a second set of processors, one or more memory address translation mappings programmed by a primary hypervisor executing on a first set of processors. The method also includes using the retrieved one or more memory address translation mappings during a data access operation.

In another particular embodiment, an apparatus includes first means for processing and second means for processing. The apparatus also includes means for programming memory address translations, where the means for programming is executable on the first means for processing. The apparatus further includes means for using the memory address translations, where the means for using is executable on the second means for processing.

In another particular embodiment, a non-transitory computer-readable medium includes instructions that, when executed by a computer, cause the computer to retrieve, by a secondary hypervisor executing on a second set of processors, one or more memory address translation mappings programmed by a primary hypervisor executing on a first set of processors. The instructions, when executed by the computer, also cause the computer to use the retrieved one or more memory address translation mappings during a data access operation.

One particular advantage provided by at least one of the disclosed embodiments is an ability to support execution of multiple hypervisors on different sets of processors (e.g., sets of processors having different instruction set architectures). Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
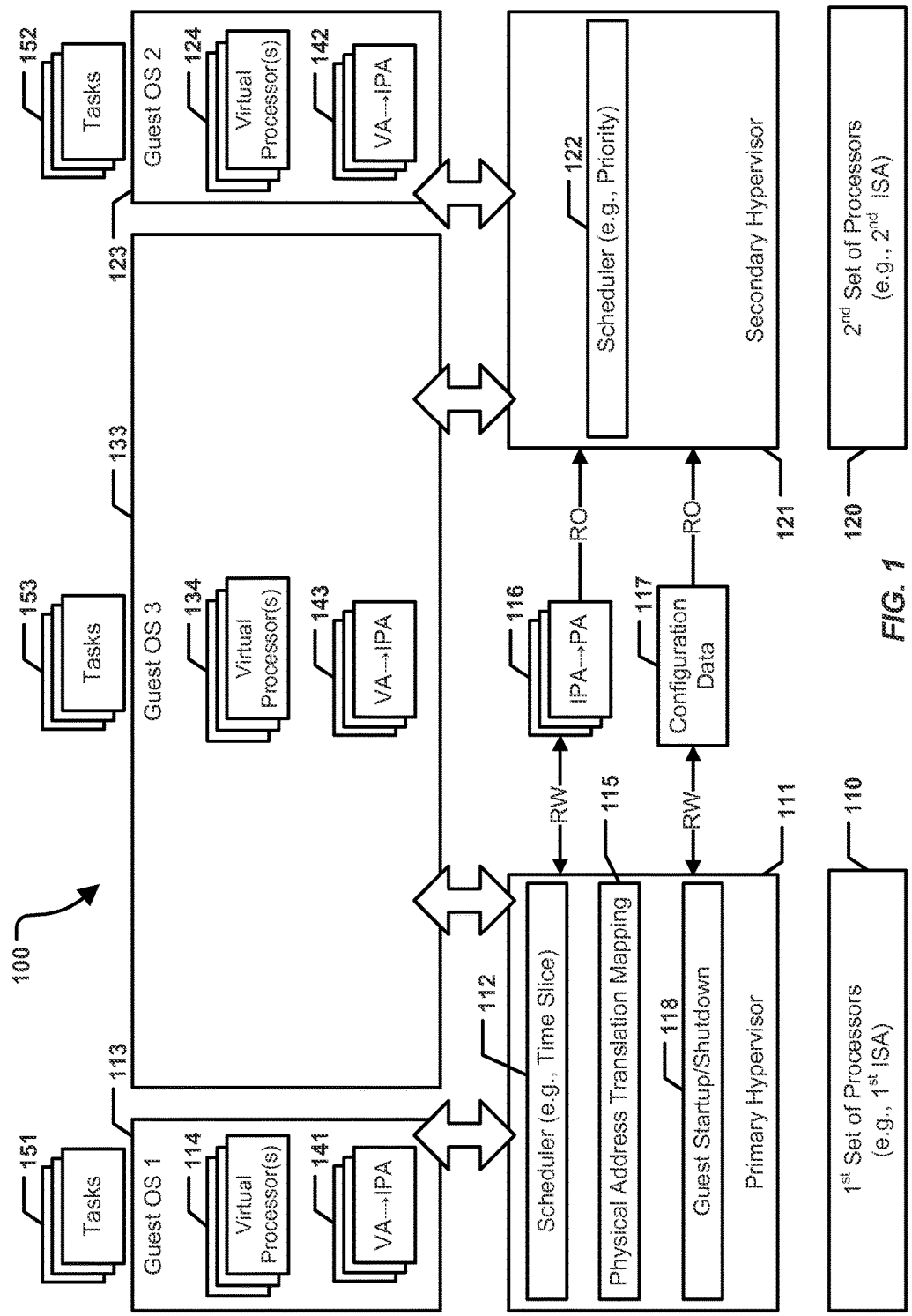
FIG. 1 is diagram of a particular embodiment of a system that is operable to execute multiple hypervisors.

FIG. 1 is diagram of a particular embodiment of a system 100 that is operable to execute multiple hypervisors. The system 100 includes a primary hypervisor 111 that is executable on a first set of processors 110 and a secondary hypervisor 121 that is executable on a second set of processors 120. Each of the sets of processors 110, 120 may include one or more processors, processing units, cores, and/or hardware threads, as further described herein. A multithreaded processor can be implemented via a processor with multiple hardware execution contexts executing concurrently, or as multiple processors with a single hardware execution context (e.g., a symmetric multiprocessing (SMP) cluster).

For example, the primary hypervisor 111 may execute on one or more central processing unit (CPU) cores/hardware threads in accordance with a first (e.g., CPU-specific) instruction set architecture and the secondary hypervisor 121 may execute on one or more digital signal processor (DSP) cores/hardware threads in accordance with a second (e.g., DSP-specific) instruction set architecture. It should be noted that the description of CPUs and DSPs herein is for example only. Other processors or sets of processors, such as network processing units (NPUs), graphical processing units (GPUs), etc., may also be included in the system 100.

Each hypervisor 111, 121 may arbitrate access to the processors 110, 120 by one or more guest operating systems. The guest operating systems may communicate with the hypervisors 111, 121 using an application programming interface (API), a shared memory region, or via some other mechanism. The primary hypervisor 111 may include a first scheduler 112 that is configured to perform "local" scheduling for guest operating system(s) that run on the first set of processors 110. "Local" scheduling by a hypervisor may refer to scheduling operations performed by the hypervisor for a guest operating system that executes exclusively on the set of processors corresponding to the hypervisor. For example, the primary hypervisor 111 may schedule virtual processors 114 of a first guest operating system 113 for execution on the first set of processors 110. Each of the virtual processors 114 may correspond to a task 151 of the first guest operating system 113 (e.g., a task created by an application executing on the first guest operating system 113).

The secondary hypervisor 121 may include a second scheduler 122 that is configured to perform "local" scheduling for guest operating system(s) that run on the second sets of processors 120. For example, the secondary hypervisor 121 may schedule virtual processors 124 of a second guest operating system 123 for execution on the second set of processors 120. Each of the virtual processors 124 may correspond to a task 152 of the second guest operating system 123 (e.g., a task created by an application executing on the second guest operating system 123). Thus, from the perspective of the hypervisors 111, 121, each of the virtual processors 114, 124 is a schedulable entity. Conversely, from the perspective of the guest operating systems 113 and 123, each of the virtual processors 114, 124 is a hardware resource abstraction.

The schedulers 112, 122 may use the same scheduling algorithm or may use different scheduling algorithms. For example, in FIG. 1, the first scheduler 112 performs time slice scheduling and the second scheduler 122 performs priority-based scheduling. To illustrate, the second scheduler 122 may perform priority-based scheduling based on the priorities of the virtual processors 124. It will be appreciated that by enabling each hypervisor 111, 121 to retain responsibility for local scheduling, the system 100 of FIG. 1 may enable each hypervisor 111, 121 to maintain quality of service (QoS) guarantees. For example, the second set of processors 120 may correspond to a DSP in a mobile phone and the secondary hypervisor 121 may execute a specific scheduling algorithm to comply with latency constraints for a guest real-time operating system (RTOS), such as a modem operating system or an audio/voice processing operating system.

Three types of memory addresses may be used in the system 100: virtual addresses (VAs), intermediate physical addresses (IPAs), and physical addresses (PAs). Each virtual address may be associated with a virtual address space, and multiple virtual address spaces may be in use at the system 100. For example, each guest operating system 113, 123 may use a different virtual address space. Each intermediate physical address may be associated with an intermediate physical address space, and multiple intermediate physical address spaces may be in use at the system 100. For example, each guest operating system 113, 123 may use a different intermediate physical address space. Physical addresses, which can be used to directly access regions of memory (e.g., random access memory (RAM), disk-based memory, cache memory, register memory, etc.) and memory-mapped devices (e.g., input/output (I/O) devices) may belong to a single physical address space.

When virtual addresses, intermediate physical addresses, and physical addresses are used in the system 100, two types of address translation mappings may be defined in the system 100. A first type of address translation mapping may be from virtual address to intermediate physical address, and a second type of address translation mapping may be from intermediate physical address to physical address. Thus, a "complete" address translation mapping for a virtual address in the system 100 may include a "first stage" translation from the virtual address to an intermediate physical address, followed by a "second stage" translation from the intermediate physical address to a physical address. Examples of first stage and second stage translations are further described with reference to FIG. 2.

In a particular embodiment, the tasks 151 and the first guest operating system 113 may refer to data stored in memory and memory-mapped devices using virtual addresses that are part of a first virtual address space. The tasks 152 and the second operating system 123 may refer to data stored in memory and memory-mapped devices using virtual addresses that are part of a second virtual space. Each of the guest operating systems 113, 123 may define first stage (i.e., VA-to-IPA) translations 141, 142 for their respective virtual address spaces. It will be appreciated that because IPAs may not directly be used to access memory or memory-mapped devices, allowing each guest operating system 113, 123 to define its own first stage translations 141, 142 may not pose a security risk.

The responsibility for determining physical address mappings (i.e., second stage translations) may be assigned solely to the primary hypervisor 111, for security reasons. For example, allowing only the primary hypervisor 111 to determine mappings for physical addresses in memory may prevent a situation in which the secondary hypervisor 121 attempts to define a physical address mapping that conflicts with a mapping defined by the primary hypervisor 111 and/or another secondary hypervisor. The secondary hypervisor 121 may thus be a "thin" hypervisor that relies on the primary hypervisor 111 for certain functions (e.g., determining second stage translations).

To determine second stage translations, the primary hypervisor 11 may include a physical address translation mapping module 115. In a particular embodiment, the physical address translation mapping module 115 may program second stage translations 116 and may determine configuration data 117 (e.g., a location of the second stage translations 116 in memory). The physical address translation mapping module 115 may program the second stage translations 116 for all guest operating systems in system 100, including guest operating systems that execute exclusively with respect to the second set of processors 120 (e.g., the guest operating system 123). As used herein, a guest operating system may execute "with respect to" a particular processor or set of processors if at least one task of the guest operating system (or at least one virtual processor corresponding to the task) can be scheduled (e.g., by a hypervisor) for execution on the particular processor or set of processors. Thus, the physical address translation mapping module 115 may program second stage translations 116 for both the first guest operating system 113 as well as the second guest operating system 123.

When performing address translation for a virtual address provided by the second guest operating system 123, the secondary hypervisor 121 may rely on the primary hypervisor 111 to provide the second stage translations 116. The secondary hypervisor 121 may use the second stage translations 116 provided by the primary hypervisor 111 to perform processor virtualization. Thus, the primary hypervisor 111 may have read/write (RW) access to the second stage translations 116 and to the configuration data 117, while the secondary hypervisor 121 has read-only (RO) access to the second stage translations 116 and to the configuration data 117, as shown in FIG. 1.

In a particular embodiment, the primary hypervisor 111 may include a startup/shutdown module 118 that is configured to startup and shutdown all guest operating systems, including those guest operating systems that execute exclusively with respect to the second set of processors 120. Thus, the startup/shutdown module 118 in the primary hypervisor 111 may startup or shutdown the second guest operating system 123 in response to a request from the secondary hypervisor 121.

In a particular embodiment, the system 100 may support concurrent execution of a single instance of a guest operating system on processors having different instruction set architectures. For example, a third guest operating system 133 may be concurrently executable on the first set of processors 110 and the second set of processors 120. Virtual processors 134 of the third guest operating system 133, which correspond to tasks 153 of the third guest operating system 133, may be scheduled by either of the schedulers 112, 122. The third guest operating system 133 may define its own first stage translations 143 but may rely on the primary hypervisor 111 for the second stage translations 116.

During operation, the guest startup/shutdown module 118 of the primary hypervisor 111 may start the first guest operating system 113. The guest startup/shutdown module 118 may also start the second guest operating system 123 in response to a request from the secondary hypervisor 121. The first guest operating system 113 may schedule the virtual processors 114 for execution on the first set of hardware processors 110 and the second guest operating system 123 may schedule the virtual processors 124 for execution on the second set of hardware processors 120.

As memory is allocated in the system 100, each of the guest operating systems 113, 123 may define respective first stage translations 141, 142. All second stage translations 116 may be defined by the physical address translation module 115 of the primary hypervisor 111. The physical address translation module 115 may also define resource settings (e.g., the configuration data 117). Thus, the primary hypervisor Ill 1 may have read-write access to the second stage translations 116 and the configuration data 117 (e.g., to set up and modify page tables for all hypervisors in the system 100). The second stage translations 116 and the configuration data 117 may be accessed in read-only fashion by the secondary hypervisor 121 to perform address translation. For example, the second stage translations 116 may be loaded by the secondary hypervisor 121 upon a context switch to one of the virtual processors 124. The system 100 of FIG. 1 thus provides a system in which the primary hypervisor 111 defines settings of one or more resources (e.g., address mappings for physical memory) and the secondary hypervisor 121 uses the settings of the resource defined by the primary hypervisor 111 to perform various operations (e.g., address translation).

In a particular embodiment, each of the logical and/or functional modules illustrated in FIG. 1 (e.g., the schedulers 112, 122, the physical address translation mapping module 115, and the guest startup/shutdown module 118) is implemented using software instructions executable by the processors 110 or 120. Alternately, such functionality may be implemented using hardware devices, such as a controller, an application-specific integrated circuit (ASIC), a field programmable gate array (FPGA) device, or some other device. It should be noted, however, that the division of operations between various modules is for illustration only. In alternate embodiments, functions described with reference to specific modules may be carried out using more or fewer modules.

The system 100 of FIG. 1 may thus enable concurrent execution of multiple hypervisors on different sets of processors, including processors having heterogeneous instruction set architectures. Advantageously, the system 100 of FIG. 1 may enable duplication of certain hypervisor operations while restricting duplication of other hypervisor operations. For example, the system 100 of FIG. 1 may provide a computing environment that maintains QoS by enabling all hypervisors to perform scheduling. The system 100 of FIG. 1 may maintain security by enabling only a primary hypervisor to define second stage translations and startup/shutdown guest operating systems.

Figure 2:
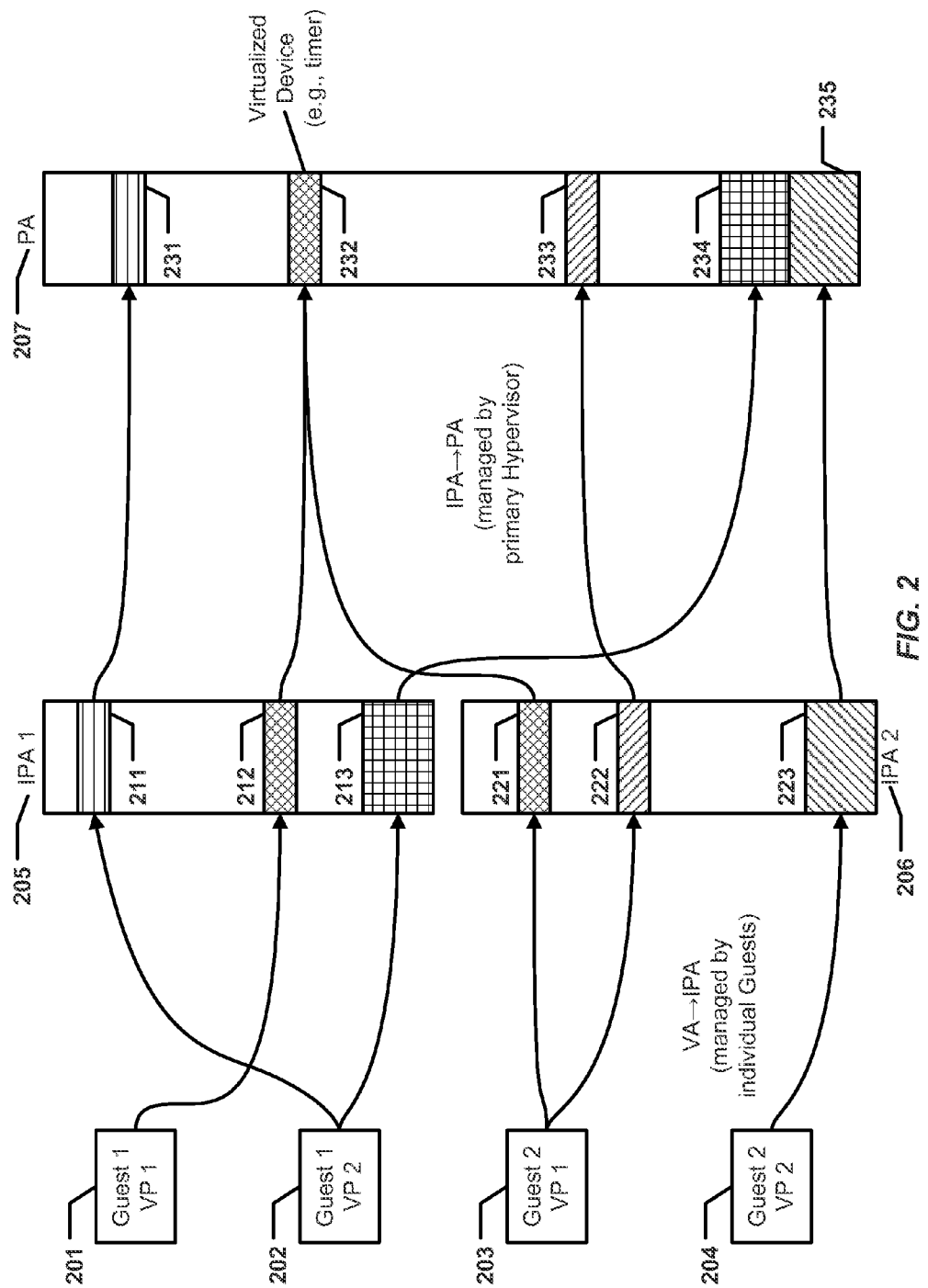
FIG. 2 is a diagram to illustrate a particular embodiment of address translation mapping that may be used by the system of FIG. 1.

FIG. 2 illustrates an example of address translation mappings. As described with reference to FIG. 1, address translation may occur in two stages. Virtual processors of each guest operating system may refer to data using virtual addresses, and each guest operating system may map the virtual addresses to intermediate physical addresses. For example, FIG. 2 illustrates virtual processors (VPs) 201, 202 of a first guest operating system (e.g., the first guest operating system 113 of FIG. 1) and virtual processors 203, 204 of a second guest operating system (e.g., the second guest operating system 123 of FIG. 1).

Virtual addresses used by the virtual processors 201, 202 may be mapped by the first guest operating system to a first intermediate physical address space 205 (designated "IPA1"), as shown. Virtual addresses used by the virtual processors 203, 204 of the second guest operating system may be mapped by the second guest operating system to a second intermediate physical address space 206 (designated "IPA2"), as shown. As described with reference to FIG. 1, intermediate addresses may be mapped to physical addresses, and all such IPA-to-PA mappings may be defined handled by the primary hypervisor.

For example, first virtual processor 201 may use a range of virtual addresses that is mapped to a range of intermediate physical addresses 212. The second virtual processor 202 may use ranges of virtual addresses that are mapped to ranges of intermediate physical addresses 211 and 213. The third virtual processor 203 may use ranges of virtual addresses that are mapped by the second guest operating system to ranges of intermediate physical addresses 221 and 222. The fourth virtual processor 204 may use a range of virtual addresses that is mapped to a range of physical addresses 223.

Each range of intermediate physical addresses 211-213, 221-223 may be mapped to corresponding ranges of physical addresses 231-235 within a single physical address space 207 (designated "PA"), as shown. In a particular embodiment, address ranges from different intermediate physical address spaces may be mapped to the same physical addresses. For example, FIG. 2 illustrates that both ranges of intermediate physical addresses 212 and 221 are mapped to the same range of physical addresses 232. Such a shared mapping may indicate that both the first guest operating system and the second guest operating system have access to the data or memory-mapped device corresponding to the range of physical addresses 232. For example, the range of physical addresses 232 may represent a virtualized device that is shared between guest operating systems (and hypervisors), such as a timer.

When a first hypervisor includes a memory mapped region for a virtual device but a second hypervisor does not include a memory mapped region for the virtual device, the first hypervisor may provide its guest operating systems access to the virtual device but the second hypervisor may be unable to provide its guest operating systems access to the virtual device. When both hypervisors include memory mapped regions for the virtual device, either hypervisor may provide its guest operating systems access to the virtual device.

Figure 3:
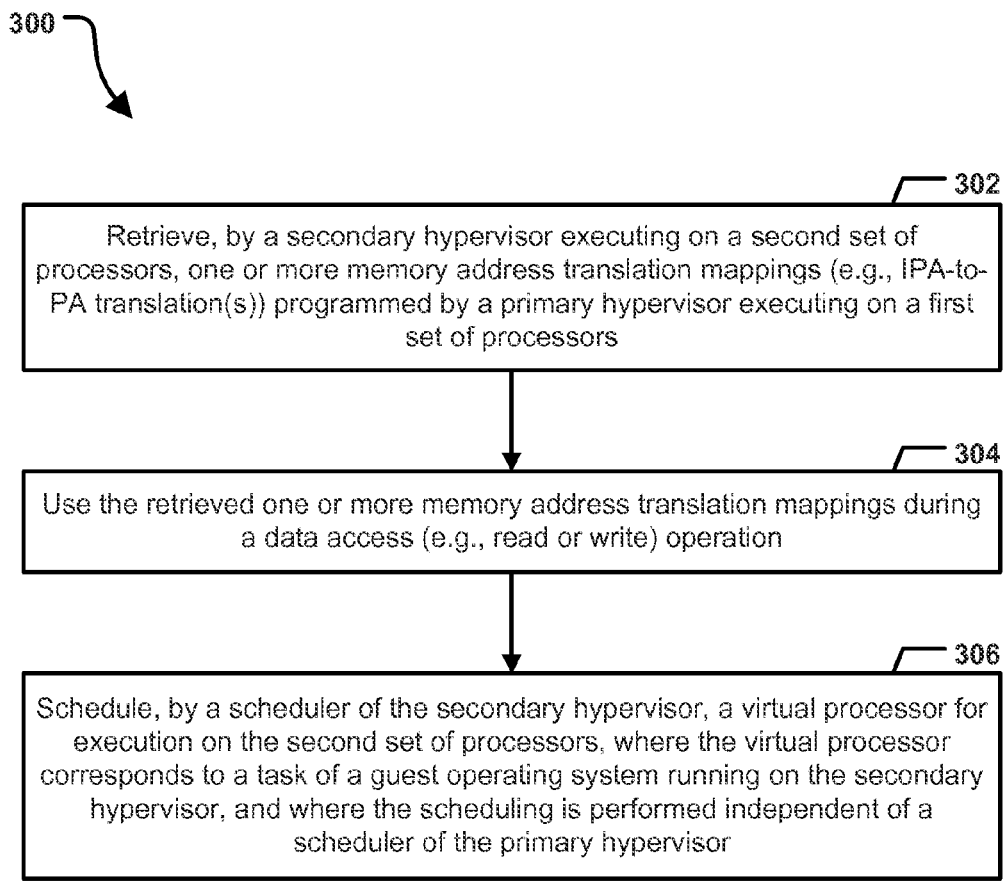
FIG. 3 is a flowchart to illustrate a particular embodiment of a method of executing multiple hypervisors.

FIG. 3 is a flowchart to illustrate a particular embodiment of a method 300 of executing multiple hypervisors. In an illustrative embodiment, the method 300 may be performed at the system 100 of FIG. 1.

The method 300 may include retrieving, by a secondary hypervisor executing on a second set of processors, one or more memory address translation mappings programmed by a primary hypervisor executing on a first set of processors, at 302. The one or more memory address translation mappings may include second stage translations (e.g., IPA-to-PA translations). For example, referring to FIG. 1, the secondary hypervisor 121 may retrieve the second stage translations 116 that are programmed by the primary hypervisor 111.

The method 300 may also include using the retrieved one or more memory address translation mappings during a data access operation, at 304. The data access operation may be a read operation or a write operation. For example, referring to FIG. 1, the secondary hypervisor 121 may use the second stage translations 116 to during a read operation or a write operation to determine a particular physical address that is a target of the read operation or the write operation.

The method 300 may also include scheduling, by a scheduler of the secondary hypervisor, a virtual processor for execution on the second set of processors, at 306. The virtual processor corresponds to a task of a second guest operating system running on the secondary hypervisor. The scheduling is performed independent of a scheduler of the primary hypervisor. For example, referring to FIG. 1, the scheduler 122 may schedule one of the virtual processors 124 corresponding to one of the tasks 152 for execution on the second set of processors 120. The operation of the scheduler 122 may be independent of the operation of the scheduler 112 of the primary hypervisor 111 (e.g., both schedulers 112, 122 may perform "local" scheduling using different scheduling algorithms independent of the other scheduler).

The method 300 of FIG. 3 may be implemented by a digital signal processor (DSP), a processing unit such as a central processing unit (CPU), a controller, a field-programmable gate array (FPGA) device, an application-specific integrated circuit (ASIC), another hardware device, a firmware device, or any combination thereof. As an example, the method 300 of FIG. 3 can be performed by a processor that executes instructions, as described with respect to FIG. 4.

Figure 4:
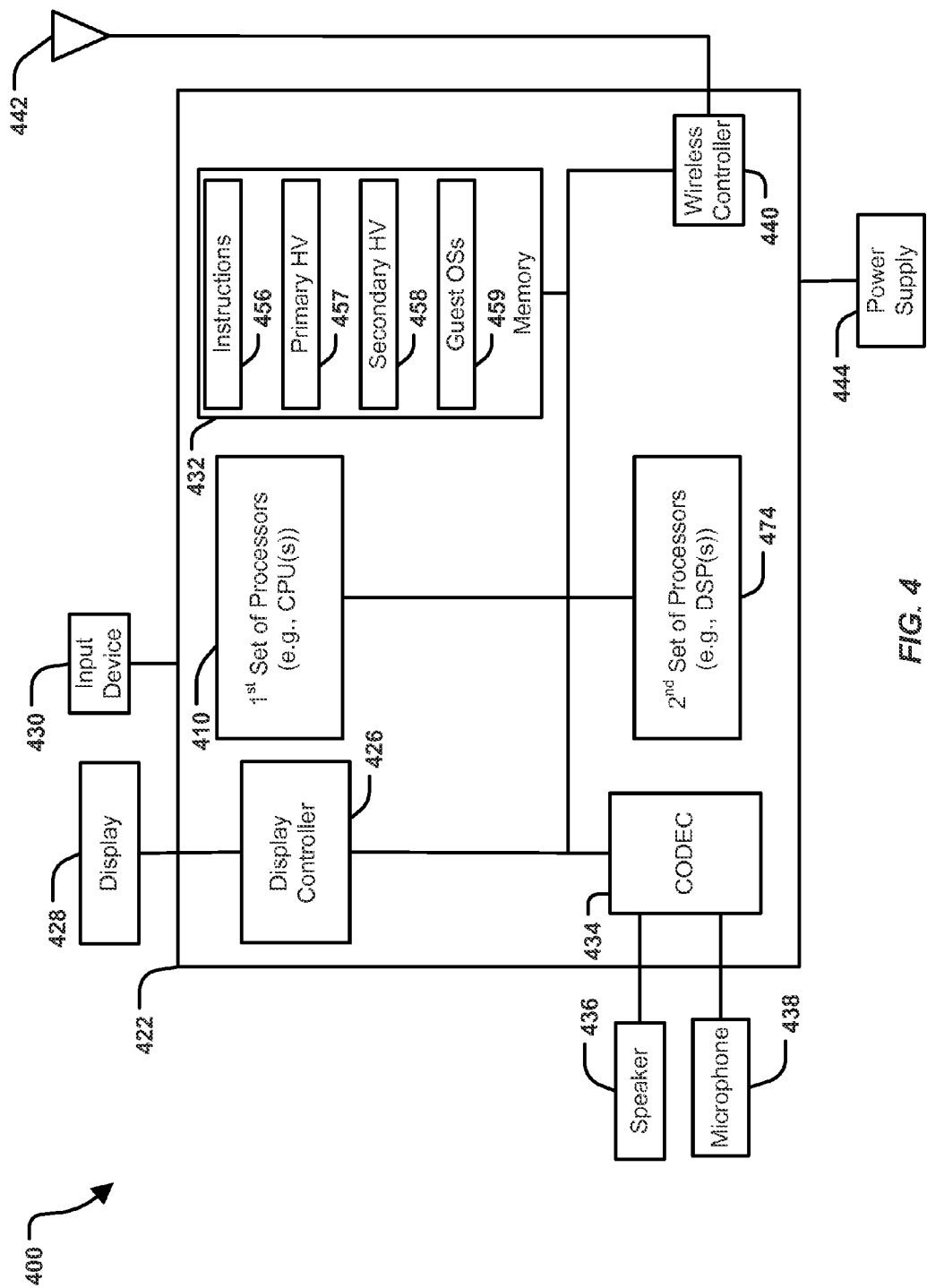
FIG. 4 is a block diagram of a wireless device including components operable to support execution of multiple hypervisors.

Referring to FIG. 4, a block diagram of an electronic device 400 is shown. The electronic device 400 includes a first set of processors 410, such as central processing unit(s) (CPU(s)) and a second set of processors 474, such as digital signal processor(s) (DSP(s)), each of which are coupled to a memory 432. The first set of processors 410 and the second set of processors 474 may have different instruction set architectures. In an illustrative embodiment, the first set of processors 410 is the first set of processors 110 of FIG. 1 and the second set of processors 474 is the second set of processors 120 of FIG. 1. The electronic device 400, or components thereof, may be included in a set top box, a music player, a video player, an entertainment unit, a navigation device, a communications device, a personal digital assistant (PDA), a fixed location data unit, a computing device, or any combination thereof.

FIG. 4 also shows a display controller 426 that is coupled to the sets of processors 410, 474 and to a display 428. A coder/decoder (CODEC) 434 can also be coupled to the sets of processors 410, 474. A speaker 436 and a microphone 438 can be coupled to the CODEC 434. FIG. 4 also indicates that a wireless controller 440 can be coupled to the sets of processors 410, 474 and to an antenna 442 (e.g., via a radio frequency (RF) interface).

The memory 432 may be a tangible non-transitory computer-readable or processor-readable storage medium that includes executable instructions 456. The instructions 456 may be executed by processor(s) such as the sets of processors 410, 474, to perform various functions and methods described herein, including the method 300 of FIG. 3. The memory 432 may also store instructions corresponding to a primary hypervisor 457 (e.g., the primary hypervisor 111 of FIG. 1), a secondary hypervisor 458 (e.g., the secondary hypervisor 121 of FIG. 1), and one or more guest operating systems 459 (e.g., one or more of the guest operating systems 113, 123, and/or 133 of FIG. 1).

In a particular embodiment, the sets of processors 410, 474, the display controller 426, the memory 432, the CODEC 434, and the wireless controller 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the antenna 442, and the power supply 444 are external to the system-on-chip device 422. However, each of the display 428, the input device 430, the speaker 436, the microphone 438, the antenna 442, and the power supply 444 can be coupled to a component of the system-on-chip device 422, such as an interface or a controller.

In conjunction with the described embodiments, an apparatus includes first means for processing and second means for processing. For example, the first means for processing may include a hardware processor, such as a processor in the first set of processors 110 of FIG. 1 or the first set of processors 410 of FIG. 4, one or more other devices or circuits to process data, or any combination thereof. The second means for processing may include a hardware processor, such as a processor in the second set of processors 120 of FIG. 1 or the second set of processors 474 of FIG. 4, one or more other devices or circuits to process data, or any combination thereof. In a particular embodiment, the first means for processing is associated with a first instruction set architecture and the second means for processing is associated with a second instruction set architecture that is different from the first instruction set architecture.

The apparatus also includes means for programming memory address translations, where the means for programming is executable on the first means for processing. For example, the means for programming may be the physical address translation mapping module 115 of FIG. 1, the primary hypervisor 457 of FIG. 4, one or more other devices, circuits, modules, or instructions to program memory address translations, or any combination thereof. The apparatus may further include means for using the memory address translations, where the means for using is executable on the second means for processing. For example, the means for using may include the secondary hypervisor 121 of FIG. 1, the secondary hypervisor 458 of FIG. 4, one or more other devices, circuits, modules, or instructions to use memory address translations, or any combination thereof.

The apparatus may include first means for scheduling virtual processors for execution on the first means for processing and second means for scheduling virtual processors for execution on the second means for processing. For example, the first means for scheduling may include the first scheduler 112 of FIG. 1, one or more other devices, circuits, modules, or instructions to schedule virtual processors for execution, or any combination thereof. The second means for scheduling may include the second scheduler 122 of FIG. 1, one or more other devices, circuits, modules, or instructions to schedule virtual processors for execution, or any combination thereof.

Those of skill would further appreciate that the logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied or implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device, a communication device, or a user terminal. In the alternative, the processor and the storage medium may reside as discrete components in a computing device, a communication device, or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a first set of hardware processors of a first instruction set architecture to execute a primary hypervisor, the primary hypervisor to schedule first virtual processor tasks for execution on the first set of hardware processors;
a second set of hardware processors of a second instruction set architecture to execute a secondary hypervisor, the secondary hypervisor to schedule second virtual processor tasks for execution on the second set of hardware processors, wherein the second instruction set architecture is different from the first instruction set architecture; and a storage device to store memory address translation mapping data that is accessible to the primary hypervisor and to the secondary hypervisor, wherein the primary hypervisor is configured to program the memory address translation mapping data, and wherein the secondary hypervisor is configured to use the memory address translation mapping data.

2. The apparatus of claim 1, wherein the first set of hardware processors includes only a single hardware processor, the second set of hardware processors includes only a single hardware processor, or any combination thereof.

3. The apparatus of claim 1, wherein the first set of hardware processors includes multiple hardware processors, wherein the second set of hardware processors includes multiple hardware processors, or any combination thereof.

4. The apparatus of claim 1, wherein the primary hypervisor has read-write access to the memory address translation mapping data and the secondary hypervisor has read-only access to the memory address translation mapping data.

5. The apparatus of claim 1, wherein the secondary hypervisor is configured to access the memory address translation mapping data to perform processor virtualization.

6. The apparatus of claim 1, wherein the primary hypervisor schedules the first virtual processor tasks in accordance with a first scheduling algorithm, and wherein the secondary hypervisor schedules the second virtual processor tasks in accordance with a second scheduling algorithm that is different from the first scheduling algorithm.

7. The apparatus of claim 6, wherein at least one of the first scheduling algorithm and the second scheduling algorithm comprises time slice scheduling.

8. The apparatus of claim 6, wherein at least one of the first scheduling algorithm and the second scheduling algorithm comprises priority-based scheduling.

9. The apparatus of claim 1, further comprising:
a first guest operating system that is executable with respect to the first set of hardware processors; and
a second guest operating system that is executable with respect to the second set of hardware processors.

10. The apparatus of claim 1, further comprising a guest operating system configured to concurrently execute on at least one processor of the first set of hardware processors and on at least one processor of the second set of hardware processors.

11. The apparatus of claim 1, further comprising a virtualized device associated with the primary hypervisor, the secondary hypervisor, or a combination thereof.

12. The apparatus of claim 11, wherein the virtualized device comprises a timer, and wherein the first set of hardware processors is distinct from the second set of hardware processors.

13. The apparatus of claim 1, further comprising:
a first guest operating system that is executable by at least one of the first set of hardware processors, the first guest operating system configured to program second memory address translation mapping data to the storage device; and
a second guest operating system that is executable by at least one of the second set of hardware processors, the second guest operating system configured to program third memory address translation mapping data to the storage device.

14. An apparatus comprising:
a first set of hardware processors of a first instruction set architecture to execute a primary hypervisor, the primary hypervisor to schedule first virtual processor tasks for execution on the first set of hardware processors and comprising a first task scheduler associated with a first scheduling algorithm;
a second set of hardware processors of a second instruction set architecture to execute a secondary hypervisor, the secondary hypervisor to schedule second virtual processor tasks for execution on the second set of hardware processors and comprising a second task scheduler associated with a second scheduling algorithm that is distinct from the first scheduling algorithm, wherein the second instruction set architecture is different from the first instruction set architecture; and
a storage device to store memory address translation mapping data that is accessible to the primary hypervisor and to the secondary hypervisor, wherein the primary hypervisor is configured to program the memory address translation mapping data, and wherein the secondary hypervisor is configured to use the memory address translation mapping data.

15. The apparatus of claim 14, wherein the primary hypervisor is configured to program memory address translation mapping data to a storage device, and wherein the secondary hypervisor is configured to use the memory address translation mapping data programmed by the primary hypervisor.

16. The apparatus of claim 15, wherein the memory address translation mapping data indicates a translation from an intermediate physical address to a physical address.

17. An apparatus comprising:
a first set of hardware processors of a first instruction set architecture to execute a primary hypervisor, the primary hypervisor to schedule first virtual processor tasks for execution on the first set of hardware processors;
a second set of hardware processors of a second instruction set architecture to execute a secondary hypervisor, the secondary hypervisor to schedule second virtual processor tasks for execution on the second set of hardware processors, wherein the second instruction set architecture is different from the first instruction set architecture; and
a storage device to store memory address translation settings data of a resource that is accessible to the primary hypervisor and to the secondary hypervisor, wherein the primary hypervisor is configured to program the memory address translation settings data stored at the storage device, and wherein the secondary hypervisor is configured to use the resource based on the memory address translation settings data.

18. The apparatus of claim 17, wherein the resource comprises at least a portion of a memory, a memory-mapped device, or any combination thereof.

19. The apparatus of claim 18, wherein the memory address translation settings data comprises memory address translation mapping data.

20. The apparatus of claim 17, wherein the primary hypervisor includes a first task scheduler associated with a first scheduling algorithm, and wherein the secondary hypervisor includes a second task scheduler associated with a second scheduling algorithm that is distinct from the first scheduling algorithm.

21. A method comprising:
determining, by a secondary hypervisor executing on a second set of hardware processors of a second instruction set architecture, one or more address translations from memory address translation mapping data programmed by a primary hypervisor executing on a first set of hardware processors of a first instruction set architecture, the primary hypervisor to schedule first virtual processor tasks for execution on the first set of hardware processors and the secondary hypervisor to schedule second virtual processor tasks for execution on the second set of hardware processors, wherein the second instruction set architecture is different from the first instruction set architecture; and using the one or more address translations to access a memory during a data access operation, wherein the one or more address translations is stored in a storage device that is accessible to the primary hypervisor and to the secondary hypervisor.

22. The method of claim 21, wherein the one or more address translations include a translation from an intermediate physical address to a physical address.

23. The method of claim 21, wherein the data access operation comprises a read operation or a write operation.

24. The method of claim 21, wherein the primary hypervisor has read-write access to the memory address translation mapping data, and wherein the secondary hypervisor has read-only access to the memory address translation mapping data.

25. The method of claim 21, further comprising scheduling, by a scheduler of the secondary hypervisor, a virtual processor for execution on the second set of hardware processors, wherein the virtual processor corresponds to a task of a guest operating system being executed by the secondary hypervisor, and wherein the scheduling of the virtual processor by the scheduler is performed independent of scheduling performed by the primary hypervisor.

26. An apparatus comprising:
    means for executing a primary hypervisor using a first set of hardware processors of a first instruction set architecture, the primary hypervisor to schedule first virtual processor tasks for execution on the first set of hardware processors and-to program memory address translation mapping data; and
    means for executing a secondary hypervisor using a second set of hardware processors of a second instruction set architecture, the secondary hypervisor to schedule second virtual processor tasks for execution on the second set of hardware processors and to use the memory address translation mapping data, wherein the second instruction set architecture is different from the first instruction set architecture, wherein the means for executing the primary hypervisor and the means for executing the secondary hypervisor are executed on the first set of hardware processors and the second set of hardware processors, respectively, and wherein the memory address translation mapping data is accessible to the primary hypervisor and to the secondary hypervisor and is stored in a memory.

27. A non-transitory computer-readable medium comprising instructions that, when executed by a computer, cause the computer to:
    determine, by a secondary hypervisor executing on a second set of hardware processors of a second instruction set architecture, one or more address translations from memory address translation mapping data programmed to a storage device by a primary hypervisor executing on a first set of hardware processors of a first instruction set architecture, the primary hypervisor to schedule first virtual processor tasks for execution on the first set of hardware processors and the secondary hypervisor to schedule second virtual processor tasks for execution on the second set of hardware processors, wherein the second instruction set architecture is different from the first instruction set architecture; and
    use the one or more address translations to access a portion of a memory during a data access operation to a memory, wherein the one or more address translations is stored in a storage device that is accessible to the primary hypervisor and to the secondary hypervisor.

28. The non-transitory computer-readable medium of claim 27, wherein the one or more address translations include a translation from an intermediate physical address to a physical address.

29. The non-transitory computer-readable medium of claim 27, wherein the primary hypervisor has read-write access to the memory address translation mapping data, and wherein the secondary hypervisor has read-only access to the memory address translation mapping data.

30. The apparatus of claim 13, wherein the second memory address translation mapping data indicates a first translation from a first virtual address to a first intermediate physical address, and wherein the memory address translation mapping data programmed by the primary hypervisor indicates a second translation from the first intermediate physical address to a first physical address.

31. The apparatus of claim 30, wherein the third memory address translation mapping data indicates a third translation from a second virtual address to a second intermediate physical address, and wherein the memory address translation mapping data programmed by the primary hypervisor indicates a fourth translation from the second intermediate physical address to a second physical address.

* * * * *